United States Patent Office 3,415,761
Patented Dec. 10, 1968

3,415,761
PROCESS FOR POLYMERIZATION OF EPOXIDES
Edwin J. Vandenberg, Wilmington, Del., assignor to Hercules Incorporated, a corporation of Delaware
No Drawing. Filed Mar. 31, 1960, Ser. No. 18,888
22 Claims. (Cl. 260—2)

This invention relates to a new process for polymerizing epoxides and more particularly to a process for polymerizing epoxides with organomagnesium compounds whereby high molecular weight polyepoxides of outstanding properties are produced.

In accordance with this invention it has been discovered that greatly improved results are obtained in the polymerization of epoxides when there is used as the catalyst for the polymerization a halogen-free organomagnesium compound that has been reacted with at least one polyreactive compound. The amount of the total polyreactive compound that is reacted with the organomagnesium compound is critical and should be an equivalent mole ratio within the range of from about 0.01 to about 0.7, and preferably from about 0.05 to about 0.5, of the polyreactive compound to the organomagnesium compound. By carrying out the polymerization in accordance with this invention it has been found that the conversion and/or rate of polymerization and/or yield are greatly improved over the process when an organomagnesium compound which has not been reacted with one of these polyreactive compounds is used as the catalyst. In addition, in many cases a much higher molecular weight polymer is obtained, and in some cases a more stereoregular polymer results.

Any epoxide wherein the epoxy group is an oxirane ring may be homopolymerized or copolymerized with a second epoxide by the process of this invention. Outstanding results are obtained with ethylene oxide, monosubstituted ethylene oxides

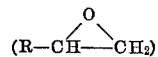

and symmetrically di-substituted ethylene oxides

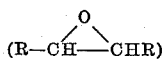

where R is a hydrocarbon radical such as alkyl, aryl, cycloalkyl, etc. Exemplary of these epoxides that may be homopolymerized or copolymerized are the alkylene oxides such as ethylene oxide, propylene oxide, 1-butene oxide, 2-butene oxides, isobutylene oxide, 1-hexene oxide, and substituted alkylene oxides such as cyclohexene oxide, styrene oxide, glycidyl ethers of phenol, bis-phenol, etc., unsaturated epoxides such as vinyl cyclohexene mono- and dioxides, butadiene monoxide, allyl glycidyl ether, etc. Halogen-containing epoxides may also be polymerized by this process and are particularly important in the preparation of copolymers of alkylene oxides. Exemplary of such halogen-containing epoxides that may be so polymerized or copolymerized are epichlorohydrin, epibromohydrin, epifluorohydrin, trifluoromethyl ethylene oxide, perfluoropropylene oxide, perfluoroethylene oxide, etc.

Any organomagnesium compound, which contains no halogen, when reacted with the above-mentioned polyreactive compounds may be used as the catalyst for the polymerization of epoxides in accordance with this invention. Preferably, the organomagnesium compound will have the formula RR'Mg where R is any hydrocarbon radical, as for example, alkyl, alkenyl, cycloalkyl, cycloalkenyl, aryl, alkaryl, cycloalkyl aryl, etc., and R' is the same as R or is H, —OR, —$NR_2$, SR, etc. Exemplary of the organomagnesium compounds that may be used for the preparation of the catalyst are dimethylmagnesium, diethylmagnesium, dipropylmagnesium, diisopropylmagnesium, di-n-butylmagnesium, diisobutylmagnesium, di(tert-butyl)-magnesium, diamylmagnesium, dioctylmagnesium, dicyclohexylmagnesium, diphenylmagnesium, ethylmagnesium hydride, butylmagnesium hydride, methoxy methylmagnesium, ethoxy ethylmagnesium, etc. Obviously, mixtures of any of these organomagnesium compounds may be used.

As pointed out above, the organomagnesium compound used as the catalyst in accordance with this invention is reacted with a polyreactive compound. By the term "polyreactive" compound is meant any compound, organic or inorganic, which has at least two sites for reaction with the organomagnesium compound. Thus, any compound which has at least two groups or sites to react with organomagnesium compounds to form an O—Mg, S—Mg, N—Mg, P—Mg, C—Mg, etc., bond may be used. Such polyreactive compounds are compounds containing at least two active hydrogens, compounds containing one active hydrogen and one of the group selected from oxygen doubly bonded to carbon (C=O), oxygen doubly bonded to nitrogen (N=O), oxygen doubly bonded to sulfur (S=O), oxygen doubly bonded to phosphorus (P=O), sulfur doubly bonded to carbon (C=S), sulfur doubly bonded to phosphorus (P=S), nitrogen doubly bonded to nitrogen (N=N), and nitrogen triply bonded to carbon (C≡N), compounds containing no active hydrogen and at least two groups selected from C=O, N=O, S=O, P=O, C=S, P=S, C≡N, and N=S, and such polyreactive compounds as carbon monoxide and nitric oxide. As is well known, an active hydrogen is a hydrogen in a compound, organic or inorganic, wherein the hydrogen is attached to a non-metallic element other than carbon such as oxygen, sulfur, nitrogen, phosphorus, etc., and, therefore, active. It may also be hydrogen attached to carbon wherein the hydrogen atom is a so-called acidic hydrogen or hydrogen activated by the presence of some activating group (an electron withdrawing group) in the α-position to the carbon to which the active hydrogen is attached, as for example, hydrogen bound to a carbon α to a C=O group, α to a —COOR group, α to a S=O group, α to an N=O group, α to a C≡N group or the equivalent N≡C group, etc. Thus, the active hydrogen may be that present in one of the following groups: —OH, —SH, —$NH_2$, —NHR, —$CONH_2$, =CHNO, =$CHNO_2$, =N—OH, —$SO_3H$, —$SO_2H$, —O—$SO_2H$, —$SO_2NH_2$, —CH—CO—,

, —COOH, etc.

Exemplary of the active hydrogen compounds containing at least two active hydrogens that may be used as the polyreactive compounds for the reaction with the organomagnesium compound to form the catalyst used in accordance with this invention are water; alkylene glycols and cycloaliphatic polyols, such as ethylene glycol, trimethylene glycol, tetramethylene glycol, pentamethylene glycol, glycerol, pentaerythritol, trimethylol propane, 2-butene-1,4-diol, 2-butyne-1,4-diol, 1,3-cyclohexanediol, 1,4-cyclohexanediol, etc.; polyhydric phenols such as resorcinol, hydroquinone, pyrocatechol, bisphenol A (p,p'-isopropylidenediphenol); ammonia; amines such as methylamine, ethylamine, n-butylamine, amylamines, etc., arylamines, such as aniline, aralkylamines, such as benzylamine, cycloalkylamines, such as cyclohexylamine, diamines, such as ethylenediamine, diethylene triamine, triethylene tetramine, hexamethylene diamine, p-phenylenediamine, piperazine; hydroxylamine; aminoalcohols, such as ethanolamine, tetrahydroxyethyl ethylene diamine, etc.; hydrazine; phenyl hydrazine, amides such as urea, thiourea, acetamide, malonamide, etc.; sulfenamides and sulfonamides such as p-toluene sulfonamide; hydrogen sulfide; dimercaptans, such as ethanedithiol, 1,5-pentanedithiol, dithiorescorcinol, etc.; 2-mercaptoethylamine; dialkyl sulfides, dialkyl disulfides, dialkyl polysulfides; sulfones and hydroxy-sulfones, such as dibutylsulfone, hydroxyethyl methyl sulfone; sulfoxides, such as dibutyl sulfoxide, dimethyl sulfoxide; acids such as sulfuric acid, sulfurous acid, phosphorus acid, phosphoric acid, carbonic acid, acetic acid, oxalic acid, phthalic acid, ethylenediamine tetraacetic acid, α,α-dioctyl ethylenediamine diacetic acid, malonic acid, succinic acid, adipic acid; ketones, such as acetone, diacetyl, dibenzoylmethane, 2-hydroxyethyl methyl ketone, acetylacetone, acetonylacetone, diacetylacetone, acetophenone; esters, such as malonic esters, as for examples, methyl malonate, ethyl malonate, etc., acetoacetic acid, esters such as ethyl acetoacetate, etc.; nitro or nitroso alkanes such as nitromethane, nitroethane, nitrosomethane, etc.; nitriles and isocyanides, such as acetonitrile, hydracrylonitrile (3 - hydroxy-propionitrile), etc.; the hydrate of formaldehyde; (HNS)$_4$; etc. Obviously, many other active hydrogen compounds wherein there are present in the molecule at least two active hydrogens may be used.

Exemplary of other polyreactive compounds that may be reacted with an organomagnesium compound to form the catalysts used in this invention are compounds containing one active hydrogen and one C=O group, as for example, benzoic acid; compounds containing one active hydrogen and one N=O group, such as nitrosophenol; compounds containing one active hydrogen and one S=O group such as benzene sulfinic acid; compounds containing one active hydrogen and one P=O group, as for example, dimethyl hydrogen phosphite; compounds containing one active hydrogen and one C=S group such as dithiobenzoic acid; compounds containing one active hydrogen compound and one P=S group such as esters of dithiophosphoric acid; compounds containing one active hydrogen and one C≡N group such as hydrogen cyanide; compounds containing at least two C=O groups and no active hydrogen such as carbon dioxide, glyoxal, the dialkyl esters of oxalic acid, etc.; compounds containing at least two N=O groups and no active hydrogen, as for example, nitrobenzene, nitrogen dioxide, etc.; compounds containing at least two S=O groups and no active hydrogen, such as sulfur dioxide; compounds containing at least two P=O groups and no active hydrogen, such as phosphorous pentoxide, tributyl phosphate, etc.; compounds containing at least two C=S groups and no active hydrogen such as carbon disulfide; compounds containing at least two P=S groups and no active hydrogen, as for example, phosphorous pentasulfide; compounds containing at least two N=S groups and no active hydrogens, such as nitrogen sulfide (N$_4$S$_4$); compounds containing at least two C≡N or N≡C groups and no active hydrogen, as for example, cyanogen, phthalyl nitriles, phenylene isocyanide, etc., compounds containing at least one N=N group, as for example, azobenzene; compounds containing at least one C=O group and at least one N=O group such as nitrosobenzaldehyde, nitrosobenzophenone, etc.

The exact nature of this reaction product of the organomagnesium compound with the polyreactive compounds is not known. It is believed that a reaction takes place whereby a portion of the hydrocarbon group attached to the magnesium is replaced with another group, the latter depending upon the polyreactive compound used. It is believed that the active catalyst species consists of at least two organomagnesium groups joined together by the polyreactive compound. Thus, if the polyreactive compound is difunctional, the reaction product with the organomagnesium compound would have the formula

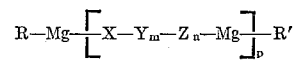

where R is an organo group, R' is an organo group, H, —OR, —NR$_2$, —SR, etc., X and Z are oxygen, sulfur, nitrogen, phosphorus,

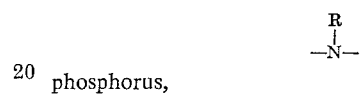

etc., and X and Z may be alike or different, Y is a divalent moiety derived from the polyreactive compound, m is 0 or 1, n is 0 or 1, and p is 1 or more. If the polyreactive compound contains three or more reactive sites, then one obtains highly branched structures, as for example, or

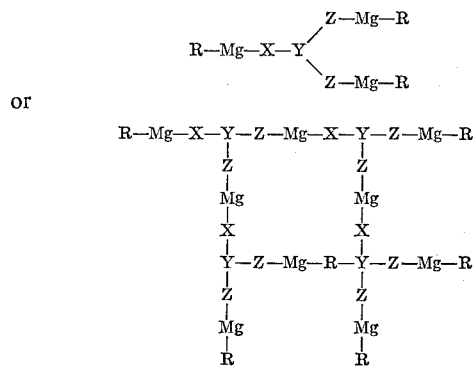

The lowest molecular species of these catalysts are generally preferred since they contain more active alkyl groups per magnesium. Regardless of what the theory of the reaction may be, it is essential that the reaction product retain magnesium to carbon bonds in an amount of from about 0.2 to about 1.8 hydrocarbon group per magnesium atom, and preferably from about 0.4 to about 1.2.

The amount of the polyreactive compound that is reacted with the organomagnesium compound will depend on the polyreactive compound, the organomagnesium compound, etc., and to some extent upon the diluent, temperature, the epoxide being polymerized, etc. In any event it sohuld be within the range of from about 0.01 to about 0.7 mole per mole equivalent of magnesium compound, preferably from about 0.05 to about 0.6 and more preferably from about 0.1 to about 0.4 based on a difunctional reactive compound. Thus, in the case of a difunctional polyreactive compound such as water, one would use from about 0.02 to about 1.4 moles of water per mole of organomagnesium compound and preferably from about 0.1 to about 1.2 mole of water per mole of magnesium, etc. If the polyreactive compound contains more than two reactive sites, the amount of the polyreactive compound will be reduced proportionately. In the case of magnesium compounds having the formula MgRR' where R is organo and R' is other than H or R, the ratio of polyreactive compound will be lower, as for example, in the range of from about 0.01 to about 0.35 mole equivalents. Below or above these ratios the polymerization is retarded or otherwise adversely affected, as for example, there is produced a liquid polymer instead of a high molecular weight solid polymer. By the term "equivalent mole ratio" as used in this specification and claims is meant the moles of polyreactive compound containing two reactive sites per equivalent of magnesium compound.

Any desired procedure may be used for reacting the organomagnesium compound with the specified ratio of the polyreactive compound. Thus, the organomagnesium compound and the polyreactive compound are preferably prereacted by adding the specified amount of the polyreactive compound to a solution or dispersion of the organomagnesium compound in an inert diluent, as for example, a hydrocarbon diluent, such as n-hexane, n-heptane, branched aliphatic hydrocarbons, aromatic hydrocarbons, such as benzene, toluene, etc., cycloaliphatic hydrocarbons, such as hexane, methylcyclohexene, etc., or an ether such as diethyl ether, diisopropyl ether, etc., or a mixture of such diluents. These organomagnesium—active hydrogen compound reaction products may be used immediately or aged, or if desired, heat-treated in some cases. The reaction of the organomagnesium compound and the active hydrogen compound may also be carried out by reacting the two reagents in situ in the polymerization reaction mixture. This may be accomplished by the addition of a specified amount of the active hydrogen compound to the epoxide or mixture of epoxides being polymeried and then adding the organomagnesium compound, or the two reagents may be added to the polymerization reaction mixture simultaneously.

In some cases it has been found to be advantageous to react the organomagnesium-polyreactive compound reaction product with a complexing agent, as for example, an ether such as diethyl ether, tetrahydrofuran, dioxane, etc., a thioether, an aminoether, a tertiary amine, or a tertiary phosphine, etc. In this case the organomagnesium compound may be reacted first with the polyreactive compound, and then with the complexing agent or the latter may be added to the polymerization diluent, or the complexing agent may be present while forming the catalyst. The amount of complexing agent reacted with the catalyst varies widely with the nature of the complexing agent. Thus, with weak complexing agents such as diethyl ether and dioxane, one may use from 0.1 up to 100 or more moles per magnesium and with stronger complexing agents such as tertiary amines, phosphines, some cyclic ethers, etc., an amount of from 0.1 to about 10 moles per magnesium may be used, and preferably from about 1 to about 3 moles per magnesium is used. In the case of the weaker complexing agents such as diethyl ether, the complexing agent may be used as the sole diluent for the polymerization.

Any amount of the organomagnesium reaction product prepared as described above may be used to catalyze the polymerization process in accordance with this invention from a minor catalytic amount up to a large excess, but in general, will be within the range of from about 0.2 to 10 mole percent based on the magnesium and the monomer or monomers being polymerized and preferably will be within the range of from about 1 to about 5 mole percent. The amount used depends in part on such factors as monomer purity, diluent purity, etc., less pure epoxides and diluents requiring more catalyst to destroy reactive impurities.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced or raised to a convenient level by adjusting the pressure) so as to remove the heat of reaction. It may also be carried out in the presence of an inert diluent.

Any diluent that is inert under the polymerization reaction conditions may be used as, for example, ethers such as the dialkyl, aryl or cycloalkyl ethers as, for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, branched aliphatic hydrocarbons, cyclohexane, etc. Obviously, any mixture of such diluents may be used and in many cases is preferable. The polymerization process may also be carried out in the presence of additives, such as antioxidants, carbon black, zinc stearate, some accelerators and other curatives, etc.

The polymerization process in accordance with this invention may be carried out over a wide temperature range and pressure. Usually, it will be carried out at a temperature from about −80° C. up to about 150° C., preferably within the range of from about −50° C. to about 120° C., and more preferably from about −30° C. to about 100° C. Usually, the polymerization process will be carried out at autogeneous pressure, but superatmospheric pressures up to several hundred pounds may be used if desired and in the same way, subatmospheric pressures may also be used.

The following examples exemplify the improved results that may be obtained on polymerizing epoxides in accordance with this invention. All parts and percentages are by weight unless otherwise indicated. As will be seen from these examples, the process of this invention makes it possible to not only obtain greatly improved yields of polymer but makes it possible to produce polymers of exceptionally high molecular weight. The molecular weight of the polymers produced in these examples is shown by the reduced specific viscosity (RSV) given for each. By the term "Reduced Specific Viscosity" is meant the $\eta_{sp./c.}$ determined on a 0.1% solution of the polymer in a given diluent. In the case of polyethylene oxide the RSV is determined in chloroform at 25° C., and in the case of polypropylene oxide the RSV is determined in benzene at 25° C. Hence, in the citation of the RSV, the diluent, and temperature at which the RSV is determined are stipulated.

Examples 1–3

In each of these examples a polymerization vessel filled with nitrogen was charged with that part of the diluent not added with the catalyst (n-heptane, except in 2$f$ where a 50:50 mixture of n-heptane and toluene was used) and 10 parts of ethylene oxide. After equilibrating the vessel and contents at 30° C., the catalyst was injected. The catalyst solution used in each of these examples was prepared under nitrogen and in the presence of glass beads from 0.33 part of diethylmagnesium in ether (about 0.5 M solution), except for 2 g. where a finely divided dispersion of diethylmagnesium in n-heptane was used, then adding to the solution an amount of the specified compounds containing at least two active hydrogens equal to the specified mole ratio, and the mixture was agitated at 30° C. for 20 hours. The polymerization reaction mixtures were agitated at 30° C. for 19 hours. In Table I is set forth the total parts of diluent and the percent thereof that was ether and the catalyst.

The ether-insoluble polyethylene oxide produced was isolated by adding excess ether to the reaction mixture, filtering off the insoluble portion, washing it with ether, then with 0.5% hydrogen chloride in an 80:20 mixture of ether-methanol, with ether:methanol alone until neutral and then with ether containing 0.5% Santonox, i.e. 4,4'-thiobis(6-tert-butyl-m-cresol).

In Table I is set forth the total percent conversion to polymer in each case together with the amount of isolated polymer produced in each case indicated as percent conversion to isolated polymer and percent of the total polymer, and the RSV of the polymer. Also tabulated is the ether-soluble polymer produced as determined by a total solids on an aliquot of the combined ether washes.

ether therein, the catalyst used, together with total percent conversion, and the conversion to ether-insoluble

TABLE I

| Example | Diluent | | Catalyst | Total percent Conv. | Isolated Polymer | | | Ether-Soluble Polymer, Percent Conv. |
|---|---|---|---|---|---|---|---|---|
| | Total Parts | Percent Ether | | | Percent Conv. | RSV | Percent of Total | |
| Control | 34.3 | 13.7 | $(C_2H_5)_2Mg$ | 4 | 2.1 | 49 | 50 | 2 |
| 1a | 34.8 | 27.6 | $(C_2H_5)_2Mg\cdot 0.3$ Acetylacetone | 21 | 21 | 86 | 100 | 0 |
| 1b | 34.8 | 27.6 | $(C_2H_5)_2Mg\cdot 0.5$ Acetylacetone | 85 | 85 | 49 | 100 | 0 |
| 1c | 34.8 | 27.6 | $(C_2H_5)_2Mg\cdot 0.7$ Acetylacetone | 86 | 86 | 28 | 100 | 0 |
| 2a | 34.2 | 15.8 | $(C_2H_5)_2Mg\cdot 0.03$ Resorcinol | 38 | 38 | 118 | 100 | 0 |
| 2b | 34.2 | 15.8 | $(C_2H_5)_2Mg\cdot 0.1$ Resorcinol | 79 | 79 | 107 | 100 | 0 |
| 2c | 34.2 | 15.8 | $(C_2H_5)_2Mg\cdot 0.3$ Resorcinol | 98 | 98 | 34 | 100 | 0 |
| 2d | 34.2 | 15.8 | $(C_2H_5)_2Mg\cdot 0.5$ Resorcinol | 96 | 96 | 32 | 100 | 0 |
| 2e | 34.2 | 15.8 | $(C_2H_5)_2Mg\cdot 0.75$ Resorcinol | 50 | 47 | 7.8 | 94 | 3 |
| 2f | 35.4 | 15.2 | $(C_2H_5)_2Mg\cdot 0.3$ Resorcinol | 90 | 90 | 94 | 100 | 0 |
| 2g | 33.9 | 0 | $(C_2H_5)_2Mg\cdot 0.3$ Resorcinol | 91 | 91 | 41 | 100 | 0 |
| 3a | 34.2 | 15.8 | $(C_2H_5)_2Mg\cdot 0.2$ $NH_3$ | 23 | 23 | 92 | 100 | 0 |
| 3b | 34.2 | 15.8 | $(C_2H_5)_2Mg\cdot 0.4$ $NH_3$ | 100 | 100 | 60 | 100 | 0 |
| 3c | 34.2 | 15.8 | $(C_2H_5)_2Mg\cdot 0.8$ $NH_3$ | 94 | 94 | 40 | 100 | 0 |

Examples 4–33

In these examples ethylene oxide was polymerized using various catalysts derived by the prereaction of 0.33 part diethylmagnesium (except in Examples 14, 15 and 25 where 0.23 part was used) with various compounds containing at least two active hydrogens. In each case 10 parts of ethylene oxide was polymerized using the general procedure described in Examples 1–3, carrying out the polymerization for 19 hours at 30° C. The catalyst solutions were prepared as described in those examples. The ether-insoluble poly(ethylene oxide) produced in each case was isolated as described in Examples 1–3. In Table II is set forth the total parts of diluent which was a mixture of ether and n-heptane and the percent of polymer and ether-soluble polymer and the RSV of the ether-insoluble polymer.

TABLE II

| Example | Diluent | | Catalyst | Total percent Conv. | Isolated Polymer | | | Ether-Soluble Polymer, Percent Conv. |
|---|---|---|---|---|---|---|---|---|
| | Total Parts | Percent Ether | | | Percent Conv. | RSV | Percent of Total | |
| Control | 34.3 | 13.7 | $(C_2H_5)_2Mg$ | 4 | 2.1 | 49 | 50 | 2 |
| 4 | 34.8 | 27.6 | $(C_2H_5)_2Mg\cdot 0.5$ Dibenzoylmethane | 19 | 19 | 33 | 100 | 0 |
| 5 | 34.2 | 15.8 | $(C_2H_5)_2Mg\cdot 0.6$ (2-hydroxyethyl methyl ketone) | 94 | 94 | 44 | 100 | 0 |
| 6 | 34.6 | 38.4 | $(C_2H_5)_2Mg\cdot 0.5$ Diacetyl | 90 | 90 | 22 | 100 | 0 |
| 7 | 34.6 | 38.4 | $(C_2H_5)_2Mg\cdot 0.5$ Acetic Acid | 76 | 76 | 98 | 100 | 0 |
| 8 | 34.6 | 38.4 | $(C_2H_5)_2Mg\cdot 1.0$ Acetone | 30 | 30 | 91 | 100 | 0 |
| 9 | 34.2 | 15.8 | $(C_2H_5)_2Mg\cdot 1.0$ Acetonitrile | 97 | 97 | 32 | 100 | 0 |
| 10 | 34.2 | 15.8 | $(C_2H_5)_2Mg\cdot 0.5$ Hydracrylonitrile | 86 | 86 | 52 | 100 | 0 |
| 11 | 34.5 | 28 | $(C_2H_5)_2Mg\cdot 0.5$ Acetamide | 94 | 94 | 57 | 100 | 0 |
| 12 | 34.5 | 28 | $(C_2H_5)_2Mg\cdot 0.25$ Urea | 25 | 24 | 73 | 96 | 1 |
| 13 | 34.5 | 28 | $(C_2H_5)_2Mg\cdot 0.25$ Oxalic Acid | 94 | 94 | 111 | 100 | 0 |
| 14 | 34.4 | 18.6 | $(C_2H_5)_2Mg\cdot 0.14$ Ethylene diamine tetraacetic acid | 13 | 13 | 66 | 100 | 0 |
| 15 | 34.4 | 18.6 | $(C_2H_5)_2Mg\cdot 0.28$ $\alpha,\alpha$-Dioctyl (ethylenediamine diacetic acid) | 96 | 96 | 43 | 100 | 0 |
| 16 | 34.6 | 40.5 | $(C_2H_5)_2Mg\cdot 0.5$ $H_2O$ | 30 | 29 | 178 | 97 | 1 |
| 17 | 34.6 | 40.5 | $(C_2H_5)_2Mg\cdot 0.25$ $H_2SO_4$ | 41 | 40 | 92 | 98 | 1 |
| 18 | 34.2 | 15.8 | $(C_2H_5)_2Mg\cdot 0.25$ $H_2S$ | 98 | 98 | 124 | 100 | 0 |
| 19 | 34.0 | 16.0 | $(C_2H_5)_2Mg\cdot 0.5$ Pentane-1,5-dithiol | 74 | 74 | 126 | 100 | 0 |
| 20 | 34.6 | 40.5 | $(C_2H_5)_2Mg\cdot 0.5$ $(n-C_4H_9)_2SO_2$ | 25 | 24 | 70 | 96 | 1 |
| 21 | 34.2 | 15.8 | $(C_2H_5)_2Mg\cdot 1.0$ $(n-C_4H_9)_2S$ | 80 | 80 | 155 | 100 | 0 |
| 22 | 34.6 | 40.5 | $(C_2H_5)_2Mg\cdot 0.5$ $(n-C_4H_9)_2SS$ | 79 | 79 | 289 | 100 | 0 |
| 23 | 34.2 | 15.8 | $(C_2H_5)_2Mg\cdot 0.5$ Ethylene glycol | 36 | 36 | 39 | 100 | 0 |
| 24 | 34.2 | 15.8 | $(C_2H_5)_2Mg\cdot 0.5$ Trimethylene glycol | 84 | 84 | 43 | 100 | 0 |
| 25 | 34.4 | 18.6 | $(C_2H_5)_2Mg\cdot 0.14$ Tetrahydroxyethyl ethylenediamine | 60 | 60 | 58 | 100 | 0 |
| 26 | 34.2 | 15.8 | $(C_2H_5)_2Mg\cdot 0.5$ Hydroquinone | 94 | 94 | 20 | 100 | 0 |
| 27 | 34.2 | 15.8 | $(C_2H_5)_2Mg\cdot 0.5$ Pyrocatechol | 94 | 94 | 18 | 100 | 0 |
| 28 | 34.2 | 15.8 | $(C_2H_5)_2Mg\cdot 0.5$ Bisphenol A | 72 | 72 | 41 | 100 | 0 |
| 29 | 34.2 | 15.8 | $(C_2H_5)_2Mg\cdot 0.3$ Ethanolamine | 78 | 78 | 84 | 100 | 0 |
| 30a | 34.2 | 15.8 | $(C_2H_5)_2Mg\cdot 0.5$ n-Butylamine | 22 | 18 | 135 | 82 | 4 |
| 30b | 34.2 | 15.8 | $(C_2H_5)_2Mg\cdot 1.0$ n-Butylamine | 49 | 42 | 214 | 86 | 7 |
| 31 | 34.2 | 15.8 | $(C_2H_5)_2Mg\cdot 0.17$ Ethylenediamine | 71 | 68 | 59 | 96 | 3 |
| 32 | 34.2 | 15.8 | $(C_2H_5)_2Mg\cdot 0.10$ Triethylenetetramine | 78 | 78 | 53 | 100 | 0 |
| 33 | 34.2 | 15.8 | $(C_2H_5)_2Mg\cdot 0.5$ Piperazine | 94 | 94 | 49 | 100 | 0 |

Examples 34–38

In these examples ethylene oxide was polymerized as described in Examples 1–33 but using as the catalyst various organomagnesium compounds that had been prereacted with various polyreactive compounds. In Table III is set forth the total parts of diluent, a mixture of n-heptane and ether and the percent of the latter therein, the catalyst used and amount of organomagnesium compound used to prepare it, the total percent conversion to poly(ethylene oxide), the conversion to ether-insoluble and ether-soluble polymer and the RSV of the ether-insoluble polymer, together with the data on corresponding runs made with the organomagnesium compounds which had not been reacted with a polyreactive compound.

TABLE III

| Example | Diluent | | Catalyst | Parts $R_2Mg$ | Total percent Conv. | Isolated Polymer | | | Ether-Soluble Polymer, Percent Conv. |
|---|---|---|---|---|---|---|---|---|---|
| | Total Parts | Percent Ether | | | | Percent Conv. | RSV | Percent of Total | |
| Control | 34.2 | 20 | $(i-C_3H_7)_2Mg$ | 0.44 | 3 | 3 | 43 | | |
| 34 | 34.2 | 21 | $(i-C_3H_7)_2Mg\cdot 0.5$ Aniline | 0.44 | 63 | 63 | 47 | 100 | 0 |
| 35 | 34.2 | 20 | $(i-C_3H_7)_2Mg\cdot 0.3$ Resorcinol | 0.44 | 94 | 94 | 103 | 100 | 0 |
| 36 | 34.2 | 20 | $(i-C_3H_7)_2Mg\cdot 1.0$ Acetonitrile | 0.44 | 97 | 97 | 63 | 100 | 0 |
| Control | 34 | 13.5 | $(tert.-C_4H_9)_2Mg$ | 0.55 | 3 | 3 | >5 | 100 | 0 |
| 37 | 34 | 13.5 | $(tert.-C_4H_9)_2Mg\cdot 0.3$ Resorcinol | 0.55 | 84 | 84 | 27 | 100 | 0 |
| Control | 27.4 | 14.5 | $(C_6H_5)_2Mg$ | 0.29 | 6 | 6 | 10.1 | 100 | 0 |
| 38 | 34.1 | 31 | $(C_6H_5)_2Mg\cdot 0.3$ Resorcinol | 0.71 | 80 | 80 | 24 | 100 | 0 |

Examples 39-44

Ethylene oxide was polymerized in each of these examples by the general procedure described for Examples 1-33. The catalysts used in these examples was 0.33 part of diethylmagnesium which had been reacted with either two different polyreactive, active hydrogen compounds or with a polyreactive, active hydrogen compound and a complexing agent, agitating for 20 hours at 30° C. between each addition. Thus, in Example 39 it was reacted first with acetylacetone (0.5 mole) and then with water (0.5 mole), agitating for 20 hours at 30° C. between each addition. In Example 40 it was reacted with a 37% aqueous solution of formaldehyde in the molar ratio shown. In Example 41 it was reacted first with ethanol to form ethylmagnesium ethoxide, and then with resorcinol in the specified mole ratio, and in Example 42 it was reacted with dioxane and then with resorcinol. In Examples 43 and 44 it was reacted with water and then with a complexing agent, 3-diethylaminopropanol-1, which was a complexing agent that in addition contained one active hydrogen, in Example 43 and triethylamine in Example 44 at various mole ratios and compared with runs wherein no complexing agent was added.

Gas analysis of the catalyst of 44h showed it to contain only 0.3 ethyl group per magnesium.

In Table IV are tabulated the data for each of these runs.

Example 47

The catalyst used in this example was prepared by reacting an organomagnesium compound with a polyreactive compound containing one active hydrogen and one oxygen doubly bonded to sulfur.

Ethylene oxide was polymerized as in Example 2a, but the catalyst was prepared by reacting 0.33 part of diethylmagnesium with 0.5 mole of benzene sulfinic acid per mole of magnesium. A high yield and conversion of ether-insoluble poly(ethylene oxide) was obtained.

Example 48

The catalyst used in this example was prepared by reacting an organomagnesium compound with a polyreactive compound containing one active hydrogen and one oxygen doubly bonded to phosphorus.

Ethylene oxide was polymerized as in Example 2a, but the catalyst was prepared by reacting 0.33 part of diethylmagnesium with 0.5 mole of dimethyl hydrogen phosphite [$(CH_3O)_2HPO$] per mole of magnesium. The ether-insoluble poly(ethylene oxide) so produced amounted to a conversion of 39% and had an RSV of 225. There was also produced a 3% conversion of a waxy, ether-soluble poly(ethylene oxide).

Example 49

The catalyst used in this example was prepared by reacting an organomagnesium compound with a poly-

TABLE IV

| Example | Diluent | | Catalyst | Total percent Conv. | Isolated Polymer | | | Ether-Soluble Polymer, Percent Conv. |
|---|---|---|---|---|---|---|---|---|
| | Total Parts | Percent Ether | | | Percent Conv. | RSV | Percent of Total | |
| 39 | 34.8 | 27.6 | $(C_2H_5)_2Mg \cdot 0.5$ Acetylacetone $\cdot 0.5\ H_2O$ | 86 | 86 | 41 | 100 | 0 |
| 40 | 26 | 21 | $(C_2H_5)_2Mg \cdot 0.15\ HCHO \cdot 0.44\ H_2O$ | 59 | 58 | 197 | 98 | 1 |
| 41a | 34.2 | 15.8 | $(C_2H_5)_2Mg \cdot 1.0\ C_2H_5OH$ | 1 | 1 | 13 | | 0 |
| 41b | 34.2 | 15.8 | $(C_2H_5)_2Mg \cdot 1.0\ C_2H_5OH \cdot 0.3$ Resorcinol | 80 | 80 | 50 | 100 | 0 |
| 42a | 34.2 | 15.8 | $(C_2H_5)_2Mg \cdot 27$ Dioxane | 3 | 3 | 44 | 100 | 0 |
| 42b | 34.2 | 15.8 | $(C_2H_5)_2Mg \cdot 27$ Dioxane $\cdot 0.3$ Resorcinol | 93 | 93 | 80 | 100 | 0 |
| 42c | 28.8 | 15.3 | $(C_2H_5)_2Mg \cdot 27$ Dioxane $\cdot 0.25\ H_2O \cdot 0.7$ (3-diethylaminopropanol-1). | 72 | 72 | 121 | 100 | 0 |
| 43a | 34.2 | 15.8 | $(C_2H_5)_2Mg \cdot 0.1\ H_2O \cdot 0.7$ (3-diethylaminopropanol-1) | 46 | 46 | 407 | 100 | 0 |
| 43b | 34.2 | 15.8 | $(C_2H_5)_2Mg \cdot 0.25\ H_2O$ | 11 | 11 | 142 | 100 | 0 |
| 43c | 34.2 | 15.8 | $(C_2H_5)_2Mg \cdot 0.25\ H_2O \cdot 0.7$ (3-diethylaminopropanol-1) | 50 | 50 | 248 | 100 | 0 |
| 43d | 34.2 | 15.8 | $(C_2H_5)_2Mg \cdot 0.25\ H_2O \cdot 1.0$ (3-diethylaminopropanol-1) | 65 | 29 | 320 | 45 | 36 |
| 43e | 34.2 | 15.8 | $(C_2H_5)_2Mg \cdot 0.5\ H_2O \cdot 0.7$ (3-diethylaminopropanol-1) | 55 | 45 | 784 | 82 | 10 |
| 43f | 34.2 | 15.8 | $(C_2H_5)_2Mg \cdot 0.8\ H_2O$ | 21 | 21 | 103 | 100 | 0 |
| 43g | 34.2 | 15.8 | $(C_2H_5)_2Mg \cdot 0.8\ H_2O \cdot 0.7$ (3-diethylaminopropanol-1) | 56 | 30 | 212 | 54 | 26 |
| 44a | 34.2 | 15.8 | $(C_2H_5)_2Mg \cdot 0.1\ H_2O \cdot 1.0\ (C_2H_5)_3N$ | 22 | 22 | 67 | 100 | 0 |
| 44b | 34.2 | 15.8 | $(C_2H_5)_2Mg \cdot 0.5\ H_2O \cdot 1.0\ (C_2H_5)_3N$ | 55 | 39 | 538 | 71 | 16 |
| 44c | 34.2 | 15.8 | $(C_2H_5)_2Mg \cdot 0.8\ H_2O$ | 21 | 21 | 103 | 100 | 0 |
| 44d | 34.2 | 15.8 | $(C_2H_5)_2Mg \cdot 0.8\ H_2O \cdot 1.0\ (C_2H_5)_3N$ | 64 | 53 | 200 | 83 | 11 |
| 44e | 34.2 | 15.8 | $(C_2H_5)_2Mg \cdot 1.0\ H_2O$ | 34 | 34 | 160 | 100 | 0 |
| 44f | 34.2 | 15.8 | $(C_2H_5)_2Mg \cdot 1.0\ (C_2H_5)_3N$ | 72 | 69 | 395 | 96 | 3 |
| 44g | 34.2 | 15.8 | $(C_2H_5)_2Mg \cdot 1.0\ H_2O \cdot 2.0$ | 71 | 65 | 623 | 92 | 6 |
| 44h | 34.2 | 15.8 | $(C_2H_5)_2Mg \cdot 1.2\ H_2O$ | 42 | 42 | 44 | 100 | 0 |
| 44i | 34.2 | 15.8 | $(C_2H_5)_2Mg \cdot 1.2\ H_2O \cdot 1.0\ (C_2H_5)_3N$ | 77 | 76 | 477 | 99 | 1 |
| 44j | 34.2 | 15.8 | $(C_2H_5)_2Mg \cdot 1.5\ H_2O$ | 4 | 3.5 | 9 | 90 | 0 |
| 44k | 34.2 | 15.8 | $(C_2H_5)_2Mg \cdot 1.5\ H_2O \cdot 1.0\ (C_2H_5)_3N$ | 33 | 0.7 | | 2 | 32 |

Example 45

The catalyst used in this example was prepared by reacting an organomagnesium compound with a polyreactive compound containing one active hydrogen and one oxygen doubly bonded to carbon.

Ethylene oxide was polymerized as in Example 2a and preparing the catalyst as there described except that 0.33 part of diethylmagnesium was reacted with 0.5 mole of benzoic acid per mole of magnesium. Poly(ethylene oxide) was obtained in high yield and high conversion. It was ether insoluble and had a high molecular weight.

Example 46

The catalyst used in this example was prepared by reacting an organomagnesium compound with a polyreactive compound containing one active hydrogen and one oxygen doubly bonded to nitrogen.

Ethylene oxide was polymerized as in Example 2a, but the catalyst was prepared by reacting 0.33 part of diethylmagnesium with 0.5 mole of nitrosophenol per mole of magnesium. A high conversion to ether-insoluble poly(ethylene oxide) was obtained.

reactive compound containing one active hydrogen and one sulfur doubly bonded to carbon.

Ethylene oxide was polymerized as in Example 2a, but the catalyst was prepared by reacting 0.33 part of diethylmagnesium with 0.5 mole of dithiobenzoic acid per mole of magnesium. A high yield and high conversion of ether-insoluble poly(ethylene oxide) was obtained.

Example 50

The catalyst used in this example was formed from an organomagnesium compound and a polyreactive compound containing one active hydrogen and one sulfur doubly bonded to phosphorus.

Ethylene oxide was polymerized as in Example 2a, except that 0.33 part of diethylmagnesium was reacted with 0.5 mole of the diphenyl ester of dithiophosphonic acid, i.e.

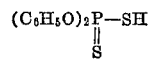

formed by the reaction of 4 moles of phenol with 1 mole of $P_2S_5$, per mole of magnesium. The poly(ethylene oxide) so obtained was of high molecular weight and was produced in high yield.

Example 51

The catalyst used in this example was formed from an organomagnesium compound and a polyreactive compound containing one active hydrogen and one nitrogen triply bonded to carbon.

Ethylene oxide was polymerized as in Example 2a, except that the catalyst was prepared by reacting 0.33 part of diethylmagnesium with 0.4 mole of hydrogen cyanide per mole of magnesium. A high yield and high conversion of ether-insoluble poly(ethylene oxide) was obtained.

Example 52

This example demonstrates the use of a catalyst prepared from an organomagnesium compound and a polyreactive compound containing at least 2 oxygens doubly bonded to carbon and no active hydrogen following the general procedure described in Example 1.

The catalyst was prepared by reacting 0.33 part of diethylmagnesium in ether solution with 0.5 mole of glyoxal per mole of magnesium and agitating the mixture for 20 hours at 30° C. Ethylene oxide (10 parts) was polymerized with this catalyst in n-heptane as the diluent (total diluent amounted to 34.6 parts of which 38.4% was ether added with the catalyst). The polymerization was run at 30° C. for 19 hours. The ether-insoluble poly(ethylene oxide) so produced amounted to a conversion of 58% and had an RSV of 100. No ether-soluble polymer was formed.

Example 53

In this example the catalyst was prepared by reacting an organomagnesium compound with a polyreactive compound containing at least two oxygens doubly bonded to nitrogen and no active hydrogen.

Ethylene oxide was polymerized as in Example 52. The total diluent was 34.6 parts of which 40.5% was ether added with the catalyst, and the catalyst was prepared by reacting an ether solution of 0.33 part of diethylmagnesium with 0.5 mole of nitrobenzene per mole of magnesium. The ether-insoluble poly(ethylene oxide) so obtained amounted to a conversion of 85% and had an RSV of 101. The ether-soluble polymer produced amounted to a conversion of 1%.

Example 54

The catalyst used was prepared by reacting an organomagnesium compound with a polyreactive compound containing at least two oxygens doubly bonded to sulfur and no active hydrogen.

Ethylene oxide was polymerized as in Example 53, but in this case the catalyst was formed by reacting 0.33 part of diethylmagnesium with 0.5 mole of sulfur dioxide per mole of magnesium. The ether-insoluble poly(ethylene oxide so produced amounted to a conversion of 100% and had an RSV of 40.

Example 55

The catalyst used in this example was prepared by reacting an organomagnesium compound with a polyreactive compound that contained at least two oxygens doubly bonded to phosphorus and no active hydrogen.

Ethylene oxide was polymerized as in Example 52, but in this case the catalyst was formed by reacting 0.33 part of diethylmagnesium with 1.0 mole of tributyl phosphate per mole of magnesium. The ether-insoluble poly(ethylene oxide) so produced amounted to a conversion of 20% and had an RSV of 176. The ether-soluble polymer produced amounted to a conversion of 3%.

Example 56

The catalyst used in this example was prepared by reacting an organomagnesium compound with a polyreactive compound containing at least two sulfurs doubly bonded to carbon and no active hydrogen.

Ethylene oxide was polymerized as in Example 53, but in this case the catalyst was formed by reacting 0.33 part of diethylmagnesium with 0.5 mole of carbon disulfide per mole of magnesium. The ether-insoluble poly(ethylene oxide) so produced amounted to a conversion of 94% and had an RSV of 162. No ether-soluble polymer was formed.

Example 57

The catalyst used in this example was prepared by reacting an organomagnesium compound with a polyreactive compound containing at least two sulfurs doubly bonded to phosphorus and no active hydrogen.

Ethylene oxide was polymerized as in Example 2a, but the catalyst used was formed by reacting 0.33 part of diethylmagnesium with 0.25 mole of phosphorus pentasulfide ($P_2S_5$) per mole of magnesium. The ether-insoluble poly(ethylene oxide) so produced had a high molecular weight and was obtained in a high yield and high conversion.

Example 58

The catalyst used in this example was prepared by reacting an organomagnesium compound with a polyreactive compound containing at least two nitrogens triply bonded to carbon and no active hydrogen.

Ethylene oxide was polymerized by the process described in Example 2a, except that the catalyst was prepared by reacting 0.33 part of diethylmagnesium with 0.4 mole of cyanogen per mole of magnesium. A high yield and conversion to ether-insoluble poly(ethylene oxide) was obtained.

Example 59

The catalyst used in this example was prepared by reacting an organomagnesium compound with a polyreactive compound containing at least two sulfurs doubly bonded to nitrogen and no active hydrogen.

Ethylene oxide was polymerized as in Example 2a, but the catalyst was prepared by reacting 0.33 part of diethylmagnesium with 0.2 mole of nitrogen sulfide ($N_4S_4$) per mole of magnesium. Ether-insoluble poly(ethylene oxide) was produced in a high yield and high conversion.

Example 60

The catalyst used in this example was prepared by reacting an organomagnesium compound with a polyreactive compound containing at least one nitrogen doubly bonded to nitrogen and no active hydrogen.

Ethylene oxide was polymerized as in Example 2a, but the catalyst was prepared by reacting 0.33 part of diethylmagnesium with 0.5 mole of azobenzene per mole of magnesium. A high conversion to ether-insoluble poly(ethylene oxide) was obtained.

Example 61

The catalyst used in this example was prepared by the reaction of an organomagnesium compound with carbon monoxide as the polyreactive compound.

Ethylene oxide was polymerized as described in Example 53, except that 0.33 part of diethylmagnesium was reacted with 0.5 mole of carbon monoxide. There was obtained a 75% conversion (99% yield) of ether-insoluble poly(ethylene oxide) having an RSV of 102.

Example 62

The catalyst used in this example was prepared by the reaction of an organomagnesium compound with nitric oxide (NO) as the polyreactive compound.

Ethylene oxide was polymerized as described in Example 2a except that 0.33 part of diethylmagnesium was reacted with 0.5 mole of nitric oxide per mole of magnesium. Ether-insoluble poly(ethylene oxide) was obtained in a high conversion and yield.

Example 63

Example 2c was repeated except that the polymerization reaction was run at 5° C. for 19 hours. The total percent conversion to poly(ethylene oxide) was 80%, all of which was ether-insoluble, and the polymer had an RSV of 26.

Examples 64–69

In these examples a variety of epoxides were homopolymerized and copolymerized, a total of 10 parts of the epoxides in each case, by the general procedure described in Examples 1—33, using as the diluent a mixture of n-heptane and ether in Examples 64–66, toluene and ether in Example 67, and all ether in Examples 68 and 69. The catalyst used as diethylmagnesium reacted with resorcinol in the specified mole ratio. The amount of diethylmagnesium used to prepare the catalyst was 0.33 part in all examples except Example 65 where 0.17 part was used, and in Example 68 where 0.66 part was used, half added at the beginning of the polymerization and the other half after 22 hours. The polymerizations were run at 30° C. for 19 hours in Examples 64, 65, 67 and 69, for 9 hours in Example 66, and for 44 hours in Example 68.

In Table V are set forth the monomers polymerized, parts of diluent and percent of ether therein, the catalyst used, together with the total percent conversion, percent of isolated polymer and RSV thereof, and percent of ether-soluble polymer in those cases where the isolated polymer was ether-insoluble.

The poly(propylene oxide) produced in Examples 64a–c was isolated in each case by adding sufficient ether to make the solution of a low enough viscosity for ease in handling, then washing the reaction mixture twice with a 3% aqueous solution of hydrogen chloride (stirring for one hour for each wash) and then washing with water until neutral. After adding an amount of Santonox equal to 0.5% based on the polymer to the reaction mixture, the diluents were evaporated, and the polymer was dried for 16 hours at 50° C. under vacuum. The poly(propylene oxide) produced in Example 64b was approximately a 50:50 mixture of amorphous and crystalline polymer. The ethylene oxide-propylene oxide copolymer produced in Example 65 was isolated by collecting the heptane-insoluble polymer, washing it twice with heptane, washing it once with a 0.5% solution of HCl in an 80:20 ether-methanol mixture, washing it neutral with heptane and finally with 0.4% Santonox in heptane and drying it. Infrared analysis showed it to contain about 77% ethylene oxide and 23% propylene oxide. The propylene oxide copolymers produced in Examples 66 and 69 were isolated as described for poly(propylene oxide) in Examples 64a–c.

The ethylene oxide-epichlorohydrin copolymer produced in Example 67 was isolated by precipitating the polymer from the reaction mixture by adding 3 volumes of ether, and then purifying the ether-insoluble polymer as described for the ether-insoluble poly(ethylene oxide) in Examples 1–3.

This ethylene oxide—epichlorohydrin copolymer was a tough, somewhat rubbery solid which, by chlorine analysis, contained 6% epichlorohydrin. It was highly crystalline by X-ray.

The ether-insoluble poly(2-chloroethyl glycidyl ether) produced in Example 68 was isolated by diluting the reaction mixture with ether, then washing it first with a 3% aqueous solution of hydrogen chloride, then with water until neutral, after which the ether-insoluble polymer was separated, washed once with ether and once with a 0.4% solution of Santonox in ether and finally was dried. It was a tacky, snappy rubber, amorphous by X-ray and analysis showed it to contain 24.6% chlorine (theory is 26.0%).

The propylene oxide—2-chloroethyl glycidyl ether copolymer of Example 69 was a tacky, snappy rubber, amorphous by X-ray and chlorine analysis showed it to contain 36% 2-chloroethyl glycidyl ether in the copolymer.

TABLE V

| Example | Monomer | Diluent Total Parts | Diluent Percent Ether | Catalyst | Total percent Conv. | Isolated Polymer Percent Conv. | Isolated Polymer RSV [2] | Isolated Polymer Percent of Total | Ether-Soluble Polymer, Percent Conv. |
|---|---|---|---|---|---|---|---|---|---|
| Control | Propylene Oxide | 17.8 | 100 | $(C_2H_5)_2Mg$ | 2 | 2 | 9.3 B | 100 | |
| 64a | do | 68.1 | 79 | $(C_2H_5)_2Mg \cdot 0.1$ Resorcinol | 17 | 17 | 9.8 B | 100 | |
| 64b | do | 68.1 | 79 | $(C_2H_5)_2Mg \cdot 0.3$ Resorcinol | 59 | 59 | 4.4 B | 100 | |
| 64c | do | 68.1 | 79 | $(C_2H_5)_2Mg \cdot 0.5$ Resorcinol | 41 | 41 | 3.7 B | 100 | |
| 65 | 50:50 EO:PO | 68.2 | 3.8 | $(C_2H_5)_2Mg \cdot 0.3$ Resorcinol | 17 | 17 | 15.3 C | 100 | |
| 66 | 95:5 PO:BMO | 70.9 | 7.6 | $(C_2H_5)_2Mg \cdot 0.3$ Resorcinol | 8 | 8 | 14.2 B | 100 | |
| 67 | 80:20 EO:ECH | 41.9 | 12.8 | $(C_2H_5)_2Mg \cdot 0.3$ Resorcinol | 22 | 20 | >7.4 B | 90 | 2 |
| 68 | 2-chloroethyl Glycidyl Ether | 42.8 | 100 | $(C_2H_5)_2Mg \cdot 0.3$ Resorcinol | 55 | 5 | 0.9 B | 9 | 50 |
| 69 | 80:20 PO:chloroethyl Glycidyl Ether | 37.4 | 100 | $(C_2H_5)_2Mg \cdot 0.3$ Resorcinol | 35 | 27 | 2.8 B | 77 | |

[1] EO=Ethylene Oxide; PO=Propylene Oxide; BMO=Butadiene Monoxide; ECH=Epichlorohydrin. [2] B=Benzene at 25° C.; [3] Liquid.

Example 70

The catalyst used in this example was formed in situ. A polymerization vessel filled with nitrogen was charged with 9 parts of propylene oxide, 1 part of allyl glycidyl ether, and 0.072 part of water. With the temperature at 30° C. there was then added 0.33 part of diethylmagnesium in 5.4 parts of diethyl ether (molar ratio of water to magnesium of 1:1). After 19 hours at 30° C., the polymerization was stopped by adding 4 parts of ethanol. A total solids on an aliquot indicated a 13% conversion to polymer. To the reaction mixture was added 1% of phenyl β-naphthylamine based on the polymer and 80 parts of benzene. After the solution was uniform, the solvents were evaporated and the copolymer was dried for 16 hours at 80° C. under vacuum. There was obtained a 13% conversion of copolymer. It was a snappy, largely amorphous, rubber with an RSV of 7.7.

Example 71

A mixture of 18 parts of propylene oxide and 2 parts of allyl glycidyl ether was copolymerized by the procedure described in Example 2c for ethylene oxide using as the catalyst $(C_2H_5)_2Mg \cdot 0.3$ resorcinol as in that example, prepared from 0.66 part of diethylmagnesium in 12.1 parts of ether. After 19 hours at 30° C. the polymerization was stopped by adding 8 parts of ethanol. The catalyst was removed by diluting the reaction mixture with ether, washing it twice with 3% aqueous hydrogen chloride (stirring for 1 hour for each wash), washing it with water until neutral, then washing it twice with 10% aqueous sodium hydroxide and again washing it with water until neutral.

One-fifth of the product was stabilized with 0.5% Santonox and dried. The residue was fractionated by recrystallization from a 1% solution in acetone at −18° C. to give a fraction amounting to 8% of the total of an acetone-insoluble copolymer which was a strong, snappy rubber having an RSV of 15.9 and moderate crystallinity by X-ray. The acetone-soluble fraction amounted to 90% of the total, had an RSV of 6.2 and by analysis (Kemp Br No.) contained 11.6% allyl glycidyl ether.

The other four-fifths of the product was stabilized with 1% phenyl β-naphthylamine and dried. The total conversion was 51%. This copolymer had an RSV of 9.0 and by X-ray was largely amorphous. A portion of this product was vulcanized using the following formula:

| | Parts |
|---|---|
| Copolymer | 100 |
| High abrasion furnace black | 50 |
| Mercaptobenzothiazole | 1.5 |
| Zinc oxide | 3.0 |
| Stearic acid | 2.0 |
| Sulfur | 2.0 | and press-curing for 60 minutes at 310° F. The physical properties of this vulcanizate were

| | |
|---|---|
| Tensile strength, p.s.i. | 1550 |
| 300% modulus, p.s.i. | 850 |
| Ultimate elongation, percent | 520 |
| Shore hardness (A2) | 68 |
| Rebound, percent | 22 |
| Break set, percent | 22 |

The foregoing examples illustrate the wide range of polyreactive compounds that may be reacted with a halogen-free organomagnesium compound to produce the catalysts used in accordance with this invention and the outstanding results obtained in polymerizing epoxides with these catalysts. For instance, poly(ethylene oxides) of exceptionally high molecular weight may be prepared, poly(ethylene oxides) having RSV's of from 100 to 800 having been prepared in the foregoing examples. These high molecular weight poly(ethylene oxides) are useful thickening and flocculating agents in aqueous systems, etc.

What I claim and desire to protect by Letters Patent is:

1. The process of producing poly(epoxides) which comprises polymerizing at least one epoxide wherein the epoxy group is an oxirane ring by contacting said epoxide with the catalyst formed by pre-reacting a halogen-free organomagnesium compound with a polyreactive compound in an equivalent mole ratio of polyreactive compound to magnesium compound of from about 0.01:1 to about 0.7:1, said polyreactive compound being selected from the group consisting of (1) monomeric compounds containing at least two groups selected from the group consisting of active hydrogen, C=O, N=O, S=O, P=O, C=S, P=S, C≡N, and N=S, (2) monomeric compounds containing the group —N=N— (3) carbon monoxide, and (4) nitrogen monoxide.

2. The process of claim 1 wherein the polyreactive compound is a compound containing at least two active hydrogens.

3. The process of claim 2 wherein the active hydrogen compound is an alkylene glycol.

4. The process of claim 2 wherein the polyfunctional compound is a polyhydric phenol.

5. The process of claim 2 wherein the active hydrogen compound is an acid containing at least two active hydrogens.

6. The process of claim 2 wherein the active hydrogen compound is water.

7. The process of claim 2 wherein the active hydrogen compound is ammonia.

8. The process of claim 2 wherein the active hydrogen compound is hydrogen sulfide.

9. The process of claim 2 wherein the organomagnesium compound is a dialkylmagnesium.

10. The process of claim 3 wherein the organomagnesium compound is a dialkylmagnesium.

11. The process of claim 4 wherein the organomagnesium compound is a dialkylmagnesium.

12. The process of claim 5 wherein the organomagnesium compound is a dialkylmagnesium.

13. The process of claim 9 wherein the epoxide that is polymerized is an alkylene oxide.

14. The process of claim 9 wherein a mixture of an alkylene oxide and an ethylenically unsaturated epoxide is copolymerized.

15. The process of polymerizing ethylene oxide which comprises contacting ethylene oxide with the catalyst formed by pre-reacting diethylmagnesium with water in a molar ratio of water to diethylmagnesium of from about 0.1 to about 1.2.

16. The process of polymerizing ethylene oxide which comprises contacting ethylene oxide with the catalyst formed by reacting diethylmagnesium with ammonia in a molar ratio of ammonia to diethylmagnesium of from about 0.2 to about 0.8.

17. The process of polymerizing ethylene oxide which comprises contacting ethylene oxide with the catalyst formed by reacting diethylmagnesium with hydrogen sulfide in a molar ratio of hydrogen sulfide to diethylmagnesium of from about 0.1 to about 1.2.

18. The process of polymerizing ethylene oxide which comprises contacting ethylene oxide with the catalyst formed by reacting diethylmagnesium with ethylene glycol in a molar ratio of ethylene glycol to diethylmagnesium of from about 0.2 to about 0.8.

19. The process of polymerizing ethylene oxide which comprises contacting ethylene oxide with the catalyst formed by pre-reacting diethylmagnesium with resorcinol in a molar ratio of resorcinol to diethylmagnesium of from about 0.2 to about 0.8.

20. The process of polymerizing a mixture of propylene oxide and allyl glycidyl ether which comprises contacting a mixture of the two epoxides with the catalyst formed by pre-reacting diethylmagnesium with resorcinol in a molar ratio of resorcinol to diethylmagnesium of from about 0.2 to about 0.8.

21. The process of claim 2 wherein the active hydrogen compound is a ketone.

22. The process of polymerizing ethylene oxide which comprises contacting ethylene oxide with the catalyst formed by pre-reacting diethylmagnesium with acetone in a molar ratio of acetone to diethylmagnesium of from about 0.1 to about 1.2.

References Cited

UNITED STATES PATENTS

| | | | |
|---|---|---|---|
| 3,065,187 | 11/1962 | Vandenberg | 260—2 |
| 3,100,750 | 8/1963 | Bailey | 260—2 |
| 3,127,371 | 3/1964 | Garty | 260—2 |
| 3,135,706 | 6/1964 | Vandenberg | 260—88.3 |
| 2,866,761 | 12/1958 | Hill | 260—2 |
| 2,956,959 | 10/1960 | Detter | 260—2 |
| 2,870,100 | 1/1959 | Stewart et al. | 260—2 |

FOREIGN PATENTS 220,517   2/1959   Australia.

WILLIAM H. SHORT, *Primary Examiner.*

T. PERTILLA, *Assistant Examiner.*

U.S. Cl. X.R.

260—88.3, 47

UNITED STATES PATENT OFFICE
CERTIFICATE OF CORRECTION

Patent No. 3,415,761

December 10, 196

Edwin J. Vandenberg

It is certified that error appears in the above identified patent and that said Letters Patent are hereby corrected as shown below:

Column 4, lines 34 to 44, that portion of the formula reading "Y-Z-Mg-R-" should read -- Y-Z-Mg-R --. Columns 9 and 10, Table IV, fourth column, line 21 thereof, "1.0($C_2H_5$)$_3$N" should read -- 1.0 $H_2O$.1.0 ($C_2H_5$)$_3$N --.

Signed and sealed this 10th day of March 1970.

(SEAL)
Attest:

Edward M. Fletcher, Jr.
Attesting Officer

WILLIAM E. SCHUYLER, JR.
Commissioner of Patents